(12) United States Patent
Nakagawa et al.

(10) Patent No.: US 7,700,233 B2
(45) Date of Patent: Apr. 20, 2010

(54) BATTERY AND METHOD OF PRODUCING THE SAME

(75) Inventors: Yugo Nakagawa, Toyohashi (JP); Kenichi Suzuki, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 793 days.

(21) Appl. No.: 11/452,294

(22) Filed: Jun. 14, 2006

(65) Prior Publication Data

US 2006/0286453 A1  Dec. 21, 2006

(30) Foreign Application Priority Data

Jun. 16, 2005  (JP)  ............... 2005-176456

(51) Int. Cl.
  *H01M 2/10*  (2006.01)
(52) U.S. Cl. ...................... 429/208; 429/233
(58) Field of Classification Search ................ 429/208, 429/186, 163, 159, 211, 233, 234; 29/623.1
  See application file for complete search history.

(56) References Cited

U.S. PATENT DOCUMENTS

| 6,746,494 | B2 | 6/2004 | Karasawa |
| 6,761,933 | B2 | 7/2004 | Warburton et al. |
| 6,761,993 | B1 | 7/2004 | Karasawa et al. |
| 6,965,090 | B2 | 11/2005 | Karasawa |
| 2004/0226153 | A1* | 11/2004 | Karasawa et al. ............... 29/2 |

FOREIGN PATENT DOCUMENTS

| EP | 1 087 459 | | 3/2001 |
| JP | 04-137356 | | 5/1992 |
| JP | 4137356 | * | 5/1992 |
| JP | 2000-58038 | | 2/2000 |
| JP | 2001-148239 | | 5/2001 |
| JP | 2001-176494 | | 6/2001 |

OTHER PUBLICATIONS

European Search Report dated May 4, 2007.

* cited by examiner

*Primary Examiner*—Patrick Ryan
*Assistant Examiner*—Monique Wills
(74) *Attorney, Agent, or Firm*—Finnegan, Henderson, Farabow, Garrett & Dunner, LLP

(57) ABSTRACT

A battery having an electrode unit in which edges of electrode plates are mechanically and electrically connected to a fixing and conducting plate is obtained. A projection is formed at an edge of each electrode plate, and projections are inserted into a grove formed on the fixing and conducting plate. Energy beam is radiated to the fixing and conducting plate along a wall defining the groove, and metal forming the groove is melted and fills a gap between the projection and the groove. The filling metal is solidified at a condition that the melted metal surrounds the projection. The electrode plate is firmly connected to the fixing and conducting plate by a combination of the projection and the surrounding metal. The electrode plates are stably maintained at a positional relationship that the electrode plates extend parallel with each other leaving a gap between adjacent electrode plates, and the electrode plates are connected to the fixing and conducting plate with a reliable electric conductivity.

4 Claims, 4 Drawing Sheets

BATTERY AND METHOD OF PRODUCING THE SAME

CROSS-REFERENCE TO RELATED APPLICATION

This application claims priority to Japanese Patent Application No. 2005-176456, filed on Jun. 16, 2005, the contents of which are hereby incorporated by reference into the present application.

BACKGROUND OF THE INVENTION

1. Field of the Invention

The present invention relates to a battery and a method of producing the same. The term "battery" as used in this specification is a general term for devices that utilize stored energy to supply electrical power, and refers to various secondary batteries and capacitors.

2. Description of the Related Art

A battery having an electrode unit formed from a plurality of electrode plates and a single fixing and conducting plate is known. Usually, the plurality of electrode plates are positioned parallel with each other, leaving a gap between adjacent electrode plates such that the plurality of edges, of the plurality of electrode plates, is aligned in the same plane. The fixing and conducting plate is arranged perpendicular to the plurality of electrode plates, and makes contact with the abovementioned plurality of edges of the plurality of electrode plates aligned in the same plane. The abovementioned plurality of edges of the plurality of electrode plates aligned in the same plane are fixed to the fixing and conducting plate, whereby as a result, the plurality of electrode plates are fixed in the position parallel with each other, leaving a gap between adjacent electrode plates such that the plurality of edges of the plurality of electrode plates are aligned in the same plane. Moreover, the plurality of electrode plates is connected electrically.

At present, the electrode plates and the fixing and conducting plate perpendicular thereto are connected together by soldering. In a case where nickel (Ni) is used as a solder material, the technology for soldering the electrode plates and the fixing and conducting plate is disclosed in Japanese unexamined patent application publication 2001-93505, for example. Specifically, a method for soldering the fixing and conducting plate to electrode plates is disclosed, wherein the electrode plate edges are coated with Ni solder material, the fixing and conducting plate is arranged perpendicular to the electrode plates, and then an energy beam is radiated onto a surface of the fixing and conducting plate on the side opposite that which contacts the electrode plates, causing the Ni solder to melt.

According to the method disclosed in Japanese unexamined patent application publication 2001-93505, when the electrode plate edges are coated with Ni solder material, variations in the thickness of the coated Ni solder material are unavoidable. If the thickness of the coated Ni solder material varies, the electrical resistance at the contacts between the fixed and conducting plate and the electrode plates will also vary.

Thus, the present invention provides an electrode unit capable of stabilizing the electrical resistance at the contacts between the electrode plates and the fixing and conducting plate that is perpendicular to the electrode plates. Additionally, the present invention provides a manufacturing method capable of stabilizing the electrical resistance at those contacts.

BRIEF SUMMARY OF THE INVENTION

The present invention proposes a battery which uses an electrode unit that ensures stability of the electrical resistance at points of contacts between electrode plates and a fixing and conducting plate that is perpendicular to the electrode plates. The present invention also proposes and a battery production method which uses the electrode unit having the stable electrical resistance at the points of contacts.

A battery of the present invention has an electrode unit in which the edges of a plurality of parallel electrode plates are fixed to a fixing and conducting plate arranged in a direction approximately perpendicular to the electrode plates. The fixing and conducting plate is used for mechanically fixing the plurality of the electrode plates and maintaining electric conductivity among the plurality of the electrode plates. At least one projection is formed on a portion of the edge of each electrode plate. In the state where the electrode plates are fixed to the fixing and conducting plate, each of the abovementioned projections is surrounded by material that forms the fixing and conducting plate. The material that surrounds each of the abovementioned projections is formed by melting and then solidifying the metal forming the fixing and conducting plate.

In the abovementioned electrode unit, the fixing and conducting plate itself is connected strongly to the projecting part of each electrode plate. The fixing and conducting plate and the electrode plates are connected together securely. Consequently, the electrical resistance is low at points of contact between the fixing and conducting plate and the electrode plate. In particular, when electrode units are mass-produced, the stable electrical resistance with low variation among points of contacts between the fixing and conducting plate and the electrode plates is extremely advantageous. As a result, high-performance batteries can be mass-produced stably. Moreover, this electrode unit does not require solder material as had been necessary in the past. A low-cost battery can be obtained, without incurring expenses for the cost of the solder material itself and for manufacturing costs associated with the application of the solder material.

Here, the term "electrode unit" refers to an integrated unit that integrates a plurality of electrode plates with a fixing and conducting plate. A "positive electrode unit" has positive electrode plates coated with positive active material, and a "negative electrode unit" has negative electrode plates coated with negative active material.

The present invention provides technical advantages when applied to at least either a positive electrode unit or a negative electrode unit, and the present invention does not necessarily require the use of both a positive electrode unit and a negative electrode unit. Of course, it is preferable that the present invention be utilized with both a positive electrode unit and a negative electrode unit.

There is no restriction to the number of electrode plates that may be used with the present invention, and this is particularly useful in the case where a large number of electrode plates is connected to a common fixing and conducting plate. In this case, the electrode unit is comprised of a plurality of electrode plates stacked so as to be parallel with each other, such that adjacent electrode plates are separated by a gap, and edges of the electrode plates are connected to a common fixing and conducting plate.

In the electrode unit of the present invention, at least one projection is formed on a portion of each of the electrode plate edges. The projections are formed at positions that overlap each other when viewed from a direction perpendicular to the plurality of electrode plates. The plurality of projections on the plurality of electrode plates are inserted into the same groove formed on the fixing and conducting plate. Each projection is surrounded at least by metal forming the fixing and conducting plate that has been melted and then solidified.

If the electrode unit has a plurality of electrode plates, a wide surface area of the active material layer can be ensured. A battery equipped with this type of electrode unit will have a high-capacity, high-power output.

Each electrode plate is preferably formed with a hole, such that the hole positions of the plurality of electrode plates overlap when viewed from a direction perpendicular to the electrode plates.

These holes can be used to align electrode plates when manufacturing a battery. By inserting an aligning rod through the holes, the holes of the electrode plates are aligned into the same position when viewed from the abovementioned direction. As a result, the edges of the electrode plates are aligned in the same plane, and the projections formed on the edges of the electrode plates are aligned into the same position when viewed from the abovementioned direction. Consequently, the projections can be inserted into a common groove formed on the fixing and conducting plate, and the area surrounding each projection can be filled uniformly with molten metal.

The abovementioned electrode unit has the significant advantage of providing stable electrical resistance at points of contacts between the fixing and conducting plate and the electrode plates. A battery comprising this electrode unit will have a high-capacity, high-power output. This electrode unit is easy to manufacture, and batteries that contain this electrode unit can be easily mass-produced.

The present invention also provides a new battery production method. A method of producing a battery of the present invention comprises the following steps, that is, positioning a plurality of electrode plates parallel with each other leaving a gap between adjacent electrode plates such that edges of the electrode plates are aligned in a plane. At least one projection is formed at a portion of the edge of each electrode plate. The method further comprises steps of fixing a fixing and conducting plate to the edges of the electrode plates such that the projections of the electrode plates are accepted within a groove formed on the fixing and conducting plate; and radiating an energy beam along the groove of the fixing and conducting plate from a side opposite the electrode plates. In this step, metal forming the fixing and conducting plate is melted at the groove, and the molten metal surrounds the projections. When the radiating step is completed and the molten metal is cooled, electrode plates are fixed to the fixing and conducting plate by their projections being surrounded by the metal that was melted and then solidified.

With this method, a battery can be obtained in which each projection of each electrode plate is connected strongly and securely to a common fixing and conducting plate.

DETAILED DESCRIPTION OF THE INVENTION

Preferred features to practice the present invention are described below.

(Feature 1) Holes are formed on electrode plate areas (lead areas) that have not been coated with active material.

(Feature 2) Projection has an approximate triangular shape.

(Feature 3) Projection has a semicircular shape.

(Feature 4) The present invention is widely applicable to batteries having electrode units in general. In the electrode unit, an electrode plate contacts a fixing and conducting plate that is approximately perpendicular to the electrode plate. The present invention is not limited to certain types of batteries. For example, the present invention is applicable to secondary batteries such as nickel-metal hydride secondary batteries, nickel cadmium batteries, lithium secondary batteries (lithium-ion secondary batteries), and to primary batteries such as manganese batteries and lithium batteries. A battery (such as a nickel-metal hydride secondary battery) having a stacked-type electrode body comprised of positive electrode plates and negative electrode plates stacked in alternating layers with a separator interposed therebetween is a typical example of a battery to which the present invention may be applied.

Preferred Embodiment

Figure 1:
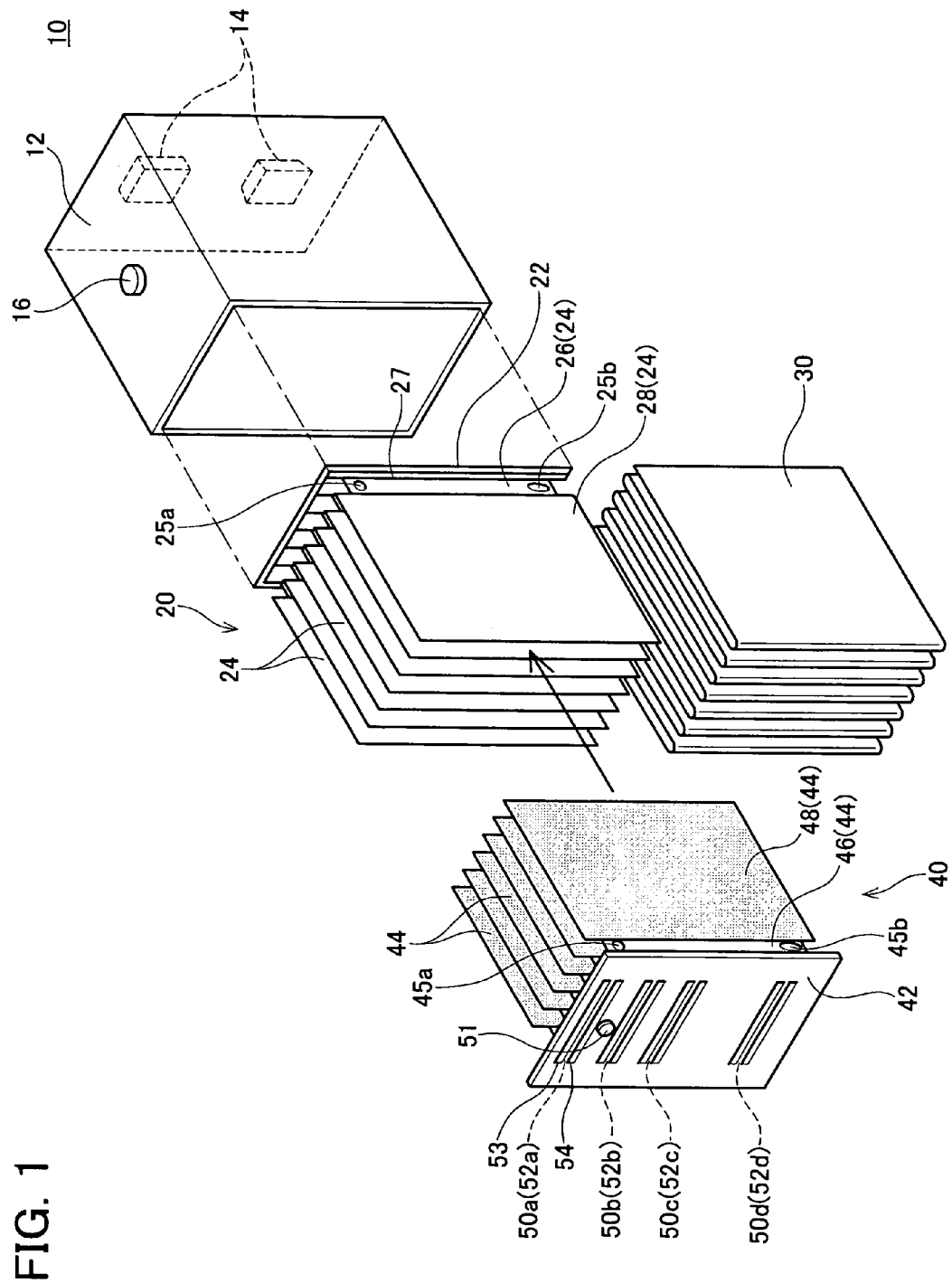
FIG. 1 is an exploded perspective view of a battery in an embodiment of the present invention.

A general description of a battery 10 relating to this embodiment is presented with reference to FIG. 1.

FIG. 1 is an exploded perspective view showing the configuration of a battery 10. FIG. 1 shows an internal structure that has been removed from a battery case 12 along lines of alternating long and short dashes, the internal structure having been separated into a negative electrode unit 40, a positive electrode unit 20 and a separator 30.

The battery 10 of this embodiment is comprised of a negative electrode unit 40 in which a plurality of negative electrode plates 44 are connected to a common negative fixing and conducting plate 42, a positive electrode unit 20 in which a plurality of positive electrode plates 24 are connected to a common positive fixing and conducting plate 22, a separator 30 arranged so as to be interposed between each negative electrode plate 44 and each positive electrode plate 24, and a battery case 12 for housing these elements internally. The negative fixing and conducting plate 42 may also be used as a sealing plate (cover) for closing the battery case 12.

Figure 2:
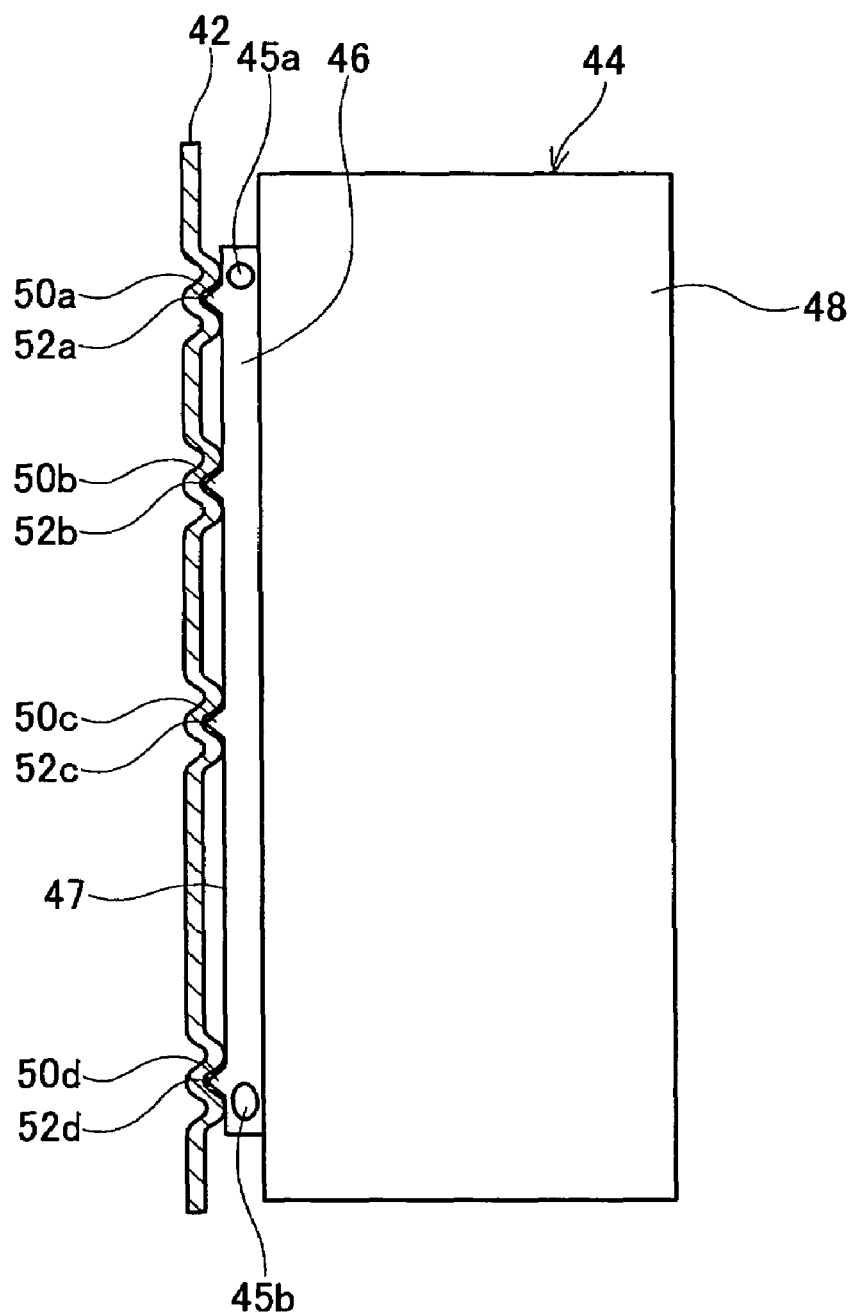
FIG. 2 is a schematic diagram showing a general outline of a cross-section of a negative electrode plate and a negative fixing and conducting plate in the same embodiment.

The negative fixing and conducting plate 42 fixedly secures the plurality of negative electrode plates 44, and electrically connects them with each other. The positive fixing and conducting plate 22 fixedly secures the plurality of positive electrode plates 24, and electrically connects them with each other FIG. 2 shows a cross-sectional profile of a negative electrode plate 44 and its corresponding negative fixing and conducting plate 42 of the present embodiment.

The negative electrode plate 44 is comprised of a flat plate made of nickel and formed into an approximate rectangular shape. As shown in FIGS. 1 and 2, both faces of the negative electrode plate 44 are covered with a negative active material layer 48 containing a hydrogen-storing metal alloy powder. In the vicinity of an edge 47 of the negative electrode plate 44, the plate material of the negative electrode plate 44 is exposed and is not covered with the negative active material layer 48. The area in which the plate material of the negative electrode plate 44 is exposed is called a lead area 46. The edge 47 of the negative electrode plate 44 is connected to the negative fixing and conducting plate 42. The negative electrode plate 44 is configured such that the vertical length of the lead area 46 in FIG. 2 is shorter than the vertical length of the negative active material layer 48. Holes 45a and 45b are provided in the lead area 46. One hole 45a is circular, and the other hole 45b is elliptical. The negative electrode plate 44 may also be made from a nickel punching metal.

On the edge 47 that connects with the negative fixing and conducting plate 42 are formed projections 50a, 50b, 50c and 50d, having an approximate triangular shape that protrudes outward in the direction toward the negative fixing and conducting plate 42. As shown in FIG. 1, an external negative electrode pin 51 is formed on the upper portion of the negative fixing and conducting plate 42. The spacing at which projections 50a, 50b and 50c are formed is narrower in the vicinity of the external negative electrode pin 51. The internal resistance of the battery 10 is decreased by concentrating, in the vicinity of the external negative electrode pin 51, the projections 50 that are points of contacts between the negative fixing and conducting plate 42 and the negative electrode plates 44.

The negative fixing and conducting plate 42 is perpendicular to the negative electrode plates 44. Moreover, the edges 47 of the negative electrode plates 44 are positioned to face the negative fixing and conducting plate 42. In other words, the plurality of edges 47 of the plurality of negative electrode plates 44 are aligned so as to be positioned in the same plane. The negative fixing and conducting plate 42 is formed from a nickel-plated steel plate. As shown in FIG. 2, formed in the negative fixing and conducting plate 42 are a groove 52a that accepts the projections 50a, a groove 52b that accepts the projections 50a, a groove 52c that accepts the projections 50c, and a groove 52d that accepts the projections 50d. Hereafter, the collective term "projection 50" shall be used when describing a phenomenon common to projections 50a, 50b, 50c and 50d, and the collective term "groove 52" shall be used when describing a phenomenon common to grooves 52a, 52b, 52c and 52d. This rule is also applied to other members.

Figure 3:
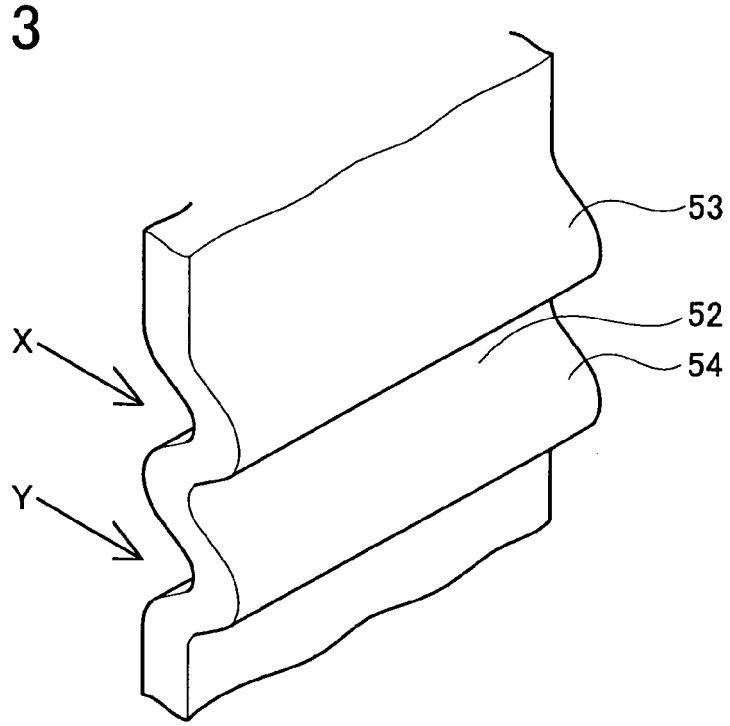
FIG. 3 is an explanatory drawing showing the shape and method of formation of a groove in the negative fixing and conducting plate in the same embodiment.

FIG. 3 shows the shape in the vicinity of the groove 52 of the negative fixing and conducting plate 42. The groove 52 is formed in a curved shape, with the corners at the bottom of the groove rounded. The groove 52 is formed by placing a pressure roller at the positions indicated by arrows X and Y, and then rolling the pressure roller. The groove 52 is formed in the valley between the two ribs 53 and 54 formed by press working. The two ribs 53 and 54 that form the groove 52 are also shown in FIG. 1.

Figure 6:
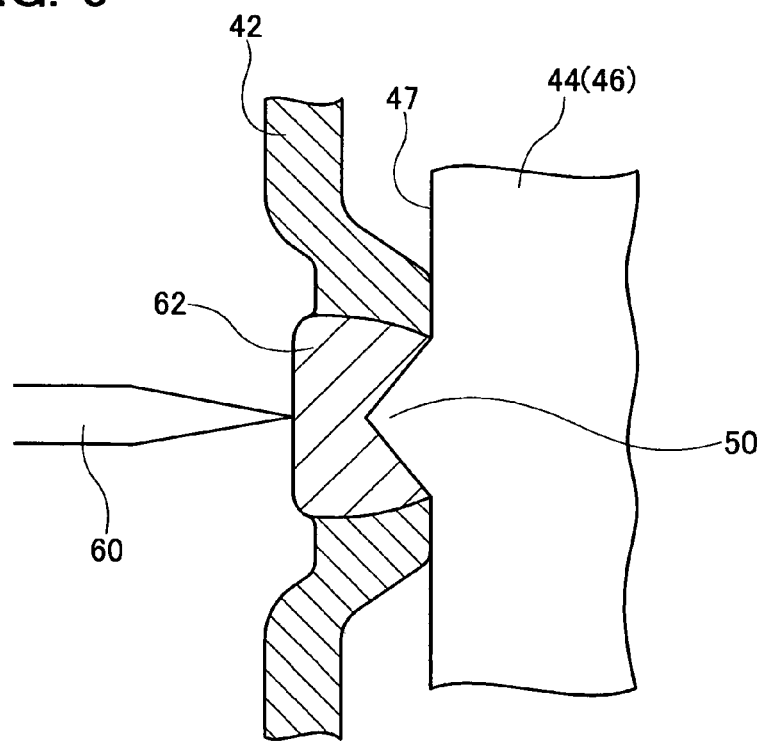
FIG. 6 is a partial detail drawing showing the appearance of a projection of the electrode plate and a fixing part of the fixing and conducting plate in the same embodiment.

FIG. 6 shows the state in which the negative electrode plate 44 is connected to the negative fixing and conducting plate 42. As shown in FIG. 6, the vicinity of the projection 50 of the negative electrode plate 44 is surrounded by metal material 62 that has been melted and then solidified, the metal material 62 being the metal material that forms the negative fixing and conducting plate 42 (nickel-plated steel plate component) or both the metal material that forms the negative fixing and conducting plate 42 and the metal material that forms the lead area 46. Because the melted and then solidified metal material 62 surrounds the vicinity of the projection 50 and is connected strongly to the projection 50, the electrical resistance is low at the point of contact between the negative electrode plate 44 and the negative fixing and conducting plate 42. Additionally, the connection between the negative electrode plate 44 and the negative fixing and conducting plate 42 has a high mechanical strength.

As shown in FIG. 1, the positive electrode plate 24 is comprised of a flat plate made of nickel that has been formed into an approximate rectangular shape. A positive active material layer 28 containing nickel hydroxide is formed on both faces of the positive electrode plate 24. A lead area 26 of exposed plate material is formed in the vicinity of an edge 27 of the positive electrode plate 24 that connects to the positive fixing and conducting plate 22. The positive electrode plate 24 is configured such that vertical length of the lead area 26 is shorter than the vertical length of the active material layer 28. Holes 25a and 25b are provided in the lead area 26. One hole 25a is circular, and the other hole 25b is elliptical.

The positive electrode plate 24 may also utilize a configuration in which the interior of a nickel foam plate is filled with active material. In this case, the lead area 26 may adopt a configuration in which the active material of unfilled metal foam is pressurized and compressed, and a nickel lead plate is welded to one side of the lead area.

On the edge 27 of the positive electrode plate 24 are formed projections at four locations spaced apart at predetermined intervals and having an approximate triangular shape that protrudes outward in the direction toward the positive fixing and conducting plate 22. (These projects are similar to the projections 50 on the negative electrode plates 44, and are not shown in the drawings.) The spacing intervals are formed such that the points of contacts between the positive electrode plates 24 and the positive fixing and conducting plate 22 do not correspond to the positions of external positive electrode pins 14, formed at two locations on the battery case 12.

The positive fixing and conducting plate 22 is perpendicular to the positive electrode plates 24. The edges 27 of the positive electrode plates 24 are positioned to face the positive fixing and conducting plate 22. In other words, the plurality of edges 27 of the plurality of positive electrode plates 24 are aligned so as to be positioned in the same plane. The positive fixing and conducting plate 22 is formed from a nickel-plated steel plate. In the positive fixing and conducting plate 22 is a formed a groove that accepts the projections formed on the edges 27 of the positive electrode plates 24, the groove being formed at a position corresponding to that of the projections. The shape of the groove and method of forming the groove are the same as for the negative electrode side, and therefore a redundant description is omitted here.

The vicinity of each projection of each positive electrode plate 24 is surrounded by a metal material that has been melted and then solidified, the metal material being the metal that forms the positive fixing and conducting plate 22 (nickel-plated steel plate component) or both the metal that forms the positive fixing and conducting plate 22 and the metal that forms the lead area 26 of the electrode plate 24. If the metal that forms the positive fixing and conducting plate 22 surrounds the vicinity of the projection of the positive electrode plate 24 and is connected strongly to the projection, the electrical resistance will be low at the point of contact between the positive electrode plate 24 and the positive fixing and conducting plate 22. Moreover, the mechanical strength of the connection between the positive electrode plate 24 and the positive fixing and conducting plate 22 will increase. The appearance of this connection is the same as shown in FIG. 6.

The separator 30 is a single long sheet of porous polypropylene that has been folded back into pleats. Each electrode plate 24 and 44 is separated by being inserted between the pleats of the separator 30. Furthermore, a porous sheet comprised of another olefin resin (such as polyethylene, for example) or a nonwoven fabric comprised of a polyamide (such as nylon, for example) may be used as the separator 30. Moreover, the separator 30 may adopt a bag-like configuration. In this case, the separator 30 houses each electrode plate 24 and 44 internally, and separates them.

The battery case 12 of the battery 10 of the present embodiment houses a predetermined number of negative electrode plates 44 and positive electrode plates 24 that are stacked (as a layered body) in alternating layers, with the separator 30 interposed between each layer. When electrode plates 24 and 44 are housed as a layered body, an optimal gap is formed between electrode plates 24 and 44. For example, sandwiched between two adjacent negative electrode plates 44 and 44 are a single positive electrode plate 24 and two separators 30. As a result, a gap having a total thickness that is the sum of the thicknesses of the single positive electrode plate 24 and two separators 30 is formed between adjacent negative electrode plates 44 and 44.

The negative active material layer 48 of the negative electrode plate 44 and the positive active material layer 28 of the positive electrode plate 24 have the same dimensions and shape, and face each other with the separator 30 interposed between each layer. The lead area 46 of the negative electrode plate 44 extends from the layered portion toward the negative fixing and conducting plate 42, and the lead area 26 of the positive electrode plate 24 extends from the layered portion toward the positive fixing and conducting plate 22. Holes 45a and 45b of the negative electrode plate 44 and holes 25a and 25b of the positive electrode plate 24 are located at positions on the lead area outside the layered portion.

Component elements of the battery 10 (the positive electrode unit 20, the negative electrode unit 40, and the separator 30) are housed inside the battery case 12 shaped approximately as a rectangular cuboid with an opening on one end. The external positive electrode pins 14 that connect to the positive fixing and conducting plate 22 are formed on the bottom face of the battery case 12, when the opening is at the top. A safety valve 16 for releasing internal pressure is provided on the sidewall of the battery case 12.

The negative fixing and conducting plate 42 is also the cover for the battery case 12. As a result, the negative fixing and conducting plate 42 seals the opening of the battery case 12. The external negative electrode pin 51 is formed on the external face of the negative fixing and conducting plate 42. The battery 10 is sealed by inserting the negative fixing and conducting plate 42 into the opening of the battery case 12, and then connecting the edge portion of the battery case 12 to the edge portion of the negative fixing and conducting plate 42 by means of laser welding or the like. An insulating gasket or the like is used to insulate the positive fixing and conducting plate 22 and the external positive electrode pins 14 from the battery case 12.

The electrolytic solution of the battery 10 is injected into the battery case 12. The electrolytic solution impregnates the separator 30 and is maintained in that state. An alkaline electrolytic solution having potassium hydroxide as its main solute is used as the electrolytic solution. Further, other alkaline electrolytic solutions having alkaline components (such as sodium hydroxide, for example) as the main solute may also be used.

Figure 4:
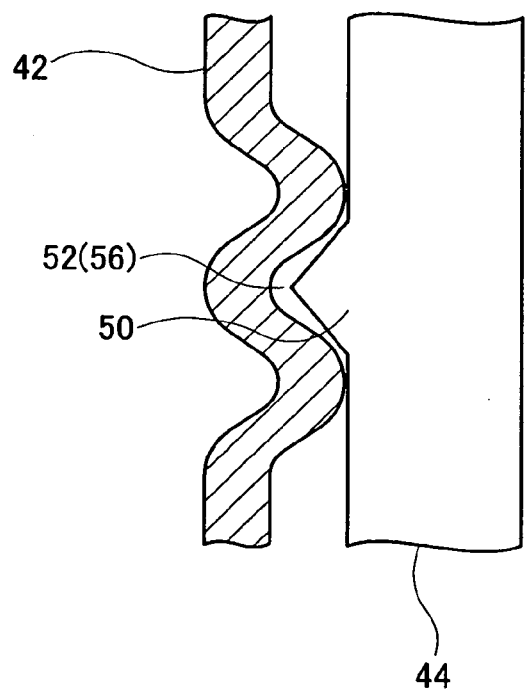
FIG. 4 is a partial detail drawing showing the state when a projection of an electrode plate is inserted into a groove of the negative fixing and conducting plate in the same embodiment.
Figure 5:
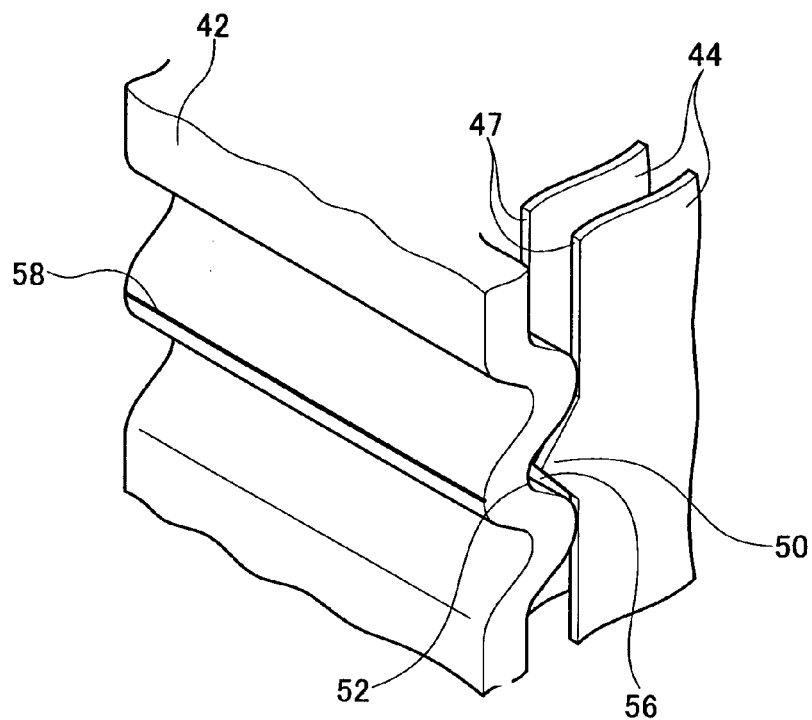
FIG. 5 is a drawing showing the radiation path of an energy beam in the same embodiment.

The method of producing the negative electrode unit 40 is described below with reference to FIGS. 2 to 6. FIG. 4 shows the state when the projection 50 of the negative electrode plate 44 is inserted into the groove 52 of the negative fixing and conducting plate 42. FIG. 5 shows the radiation path 58 of an energy beam at the time when the plates are connected together. FIG. 6 shows the appearance of the metal material 62, after having been melted by an electron beam 60 and then solidified, surrounding the vicinity of the projection 50.

Since the positive electrode unit 20 may be manufactured in the same manner as the negative electrode unit 40, a detailed explanation of the method of producing the positive electrode unit 20 is omitted here.

Firstly, a layered body is manufactured in which a predetermined number of negative electrode plates 44 and positive electrode plates 24 are stacked in alternating layers, with the separator 30 interposed between each layer. At this time, four aligning rods (not shown) are arranged in a parallel configuration, and then the aligning rods are inserted into the holes 25a, 25b, 45a and 45b of the respective electrode plates 24 and 44 to align the electrode plates 24 and 44. When the aligning rods are inserted, the holes 25a, 25b, 45a and 45b become aligned in the same position when viewed from the stacking direction. As a result, the projections 50 are aligned in the same position when viewed from the stacking direction. The holes 25a, 25b, 45a and 45b are formed on lead areas 26 and 46. Consequently, the aligning rods for holes 25a and 25b do not interfere with the stacked layers of negative electrode plates 44, and the aligning rods for holes 45a and 45b do not interfere with the stacked layers of positive electrode plates 24. By inserting the aligning rods in the holes 25a, 25b, 45a and 45b, the layered body maintains an aligned state.

When the layered body is manufactured, an optimal gap is formed between electrode plates 24 and 44. For example, sandwiched between two adjacent negative electrode plates 44 and 44 are a single positive electrode plate 24 and two separators 30. As a result, a gap having a total thickness that is the sum of the thicknesses of the single positive electrode plate 24 and two separators 30 is formed between adjacent negative electrode plates 44. Similarly, a gap having a total thickness that is the sum of the thicknesses, of a single negative electrode plate 44 and two separators 30, is formed between adjacent positive electrode plates 24.

Next, each row of projections 50a, 50a, 50c and 50c of the aligned negative electrode plates 44 is inserted into the respective grooves 52a, 52b, 52c and 52d of the negative fixing and conducting plate 42. The aligning rods maintain the stacked state of the plurality of negative electrode plates 44. As a result, the task of inserting the projection 50 rows into the grooves 52 is easy to accomplish.

In this embodiment, the projection 50 of the negative electrode plate 44 is formed in an approximately triangular shape. The groove 52 of the negative fixing and conducting plate 42 is formed with a curved shape at the bottom part of the groove. When the projection 50 of the negative electrode plate 44 is inserted into the groove 52, a space 56 is formed between the groove 52 and the projection 50. (See FIG. 4.)

Then, an electron beam 60 (see FIG. 6) is radiated from the exterior onto the negative fixing and conducting plate 42. As a result, the projection 50 of the negative electrode plate 44 is connected to the groove 52 of the negative fixing and conducting plate 42.

The metal material (nickel-plated steel plate component) of the negative fixing and conducting plate 42 melts when the electron beam 60 is radiated from the exterior onto the negative fixing and conducting plate 42. As shown in FIG. 5, the electron beam 60 radiates along a path 58. With this type of radiation path 58, the metal material that forms the negative fixing and conducting plate 42 melts in a strip-shape at the area forming the groove 52. The molten metal material enters the space between the groove 52 and the projection 50, and solidifies. The melted and then solidified metal material 62 (see FIG. 6) fills the area around the projection 50. Because the metal material melts in the vicinity of the points of contact during the connection processing and then flows into the abovementioned space 56, the contour of the negative fixing and conducting plate 42 after processing is more level than before the connection processing (see FIG. 6). As described above, the plurality of negative electrode plates 44 are stabilized by the aligning rods. Consequently, the task of connecting together the projection 50 and the negative fixing and conducting plate 42 is easy to implement.

As shown in FIG. 6, when the electron beam 60 is radiated upon the negative electrode plates 44, it melts the negative fixing and conducting plate 42 along the radiation path 58. A surface of the projection 50 may also be melted.

The negative electrode plates 44 and the negative fixing and conducting plate 42 are connected together as described above, are joined strongly by the melted and then solidified metal material 62. At the connection between the negative electrode plate 44 and the negative fixing and conducting plate 42, fluctuation in mechanical connection strength is reduced. Moreover, in a battery 10 that uses this type of negative electrode unit 40, the abovementioned connection is highly reliable, and electrical resistance and mechanical strength are at desired levels and are stable.

After the connection processing of the negative fixing and conducting plate 42 and the negative electrode plates 44 is complete, the connection processing of the positive fixing and conducting plate 22 and the positive electrode plates 24 is implemented. Also at this time, the projections are aligned into the same position when viewed from the stacking direction, and can easily be received in the groove formed on the positive fixing and conducting plate 22. When the electron beam is radiated onto the exterior face of the positive fixing and conducting plate 22, the positive fixing and conducting plate 22, or the positive fixing and conducting plate 22 and the projection surface, melt in the vicinity of the projections of the positive electrode plates 24, and then the molten metal material solidifies to fill that area and to connect the positive fixing and conducting plate 22 to the positive electrode plates 24. The connection process is the same as for the negative electrode unit. The connection processing itself is performed in the same manner as for the negative fixing and conducting plate 42, and therefore a redundant description is omitted here.

The connection processing may also be implemented first for the positive electrode side, and then for the negative electrode side. Alternatively, the connection processing for the positive electrode side and for the negative electrode side may be implemented simultaneously.

After the connection processing for the positive electrode side and the connection processing for the negative electrode side are completed, the aligning rod is removed. Thus the electrode unit is produced.

Batteries of this embodiment are manufactured as follows.

The electrode unit containing the negative electrode unit 40, the positive electrode unit 20 and the separator 30 is housed inside the battery case 12 such that the positive fixing and conducting plate 22 contacts the external positive electrode pins 14. Then, the positive fixing and conducting plate 22 and the external positive electrode pins 14 are connected together by laser welding.

The negative fixing and conducting plate 42 also serves as a cover that seals the battery case 12. The edge portion of the battery case 12 and the edge portion of the negative fixing and conducting plate 42 are connected together by laser welding.

Then, the electrolytic solution is injected through an electrolytic solution injection port (later becoming the safety valve 16) on the sidewall of the battery case 12. The nickel-metal hydride secondary battery 10 of this embodiment is completed when the safety valve 16 is installed so as to block the injection port.

Various modifications, revisions, changes and/or improvements to the above-described embodiment are possible. Various modifications can be implemented without departing from the gist and scope of the present invention. Therefore, the apparatus and method relating to the present invention are intended to include all modifications, revisions, changes and/or improvements that are publicly known or will be developed later.

For example, the electrode plates that configure the electrode unit need only to have a projection formed at a predetermined position on the edge that connects with the fixing and conducting plate, and there are no special restrictions on other elements.

The constituent material of the electrode plates may be selected as a material traditionally used in electrode plates for the type of battery to be adopted. For example, electrode plates made of nickel are selected for the positive electrode unit in a nickel-metal hydride secondary battery, and electrode plates made of aluminum are selected for the positive electrode unit in a lithium secondary battery.

There are also no special restrictions for the shape of the projections formed on the electrode plate edge connecting to the fixing and conducting plate. Typical shapes include an approximately triangular shape, an approximately semicircular shape and an approximately trapezoidal shape. Moreover, the surface of the projections may be processed (for example, the surface may be roughened) to increase wettability with respect to the metal material of the fixing and conducting plate.

The position and number of projections formed on each electrode plate are set appropriately according to the shape and configuration of the battery.

For example, in the case of application to a package-shaped battery having an electrode unit formed by stacking a plurality of flat electrode plates made from flat plates having an approximately rectangular shape, and then connecting the edges thereof to a fixing and conducting plate, it is preferable that the projections formed on each edge are provided at a plurality of locations spaced apart by predetermined intervals. This preferred embodiment enables uneven response of the electrode at the electrode surface (electrode plate surface) to be suppressed, and power to be obtained more efficiently. Further, the spacing intervals do not have to be uniform. For example, in order to reduce the internal resistance during usage, the projections may be spaced more closely together in the vicinity of the external pins. If, due to a plurality of projections, a single electrode plate connects to a fixing and conducting plate at a plurality of locations, the status of the connection between the electrode plate and the fixing and conducting plates will improve, and the connection reliability will increase.

Additionally, it is preferable that the position and number of formed projections are the same for all electrode plates. In this case, since a row of projections is formed in the stacking direction of the electrode plates, radiation with an energy beam is easy to implement during the connection processing. Moreover, this preferred embodiment prevents variation in the connections between each projections and the fixing and conducting plate, thereby improving reliability further.

It is preferable that each electrode plate used is provided with holes for aligning (for positioning). The use of this type of electrode plate enables the electrode plates to be aligned with less positional variation by simply inserting an aligning rod through the holes while the electrode plates are in a stacked state. (In other words, the provision of these holes in advance simplifies the positioning of the electrode plates.) The combination of the holes and the aligning rod further simplify the connection processing.

The provision of two or more holes is preferable. In the case where two holes are provided, by giving one hole a circular shape and the other hole a semicircular or ellipse shape, the dimensional tolerance of the electrode plates can be absorbed and the electrode plates can be aligned stably.

The present invention is also applicable to batteries in which the electrode unit has a wound structure formed by winding one or a plurality of electrode plates, such as a cylindrical battery, for example. Even in an electrode unit having such a structure, projections for contacting with the fixing and conducting plate are formed on the edge of the lead area of the electrode plate. Although there are no special restrictions concerning the location and number of projections, it is preferable that the projections be provided at a plurality of locations and be separated by an appropriate distance. For example, when using an electrode plate configured with a row of projections extending in a radial pattern from the winding center, the present invention can be preferably implemented in the same manner as a battery having the above-described stacked electrode plates.

The fixing and conducting plate of the electrode unit should be constructed from a metal material that can be melted by an energy beam, and there are no other special restrictions on the fixing and conducting plate. For example, in the case where the present invention is applied to a nickel-metal hydride secondary battery, a ferrous metal (such as nickel-plated steel plate) used in the fixing and conducting plate of conventional nickel-metal hydride secondary batteries is used. An electron beam or the like can easily melt a fixing and conducting plate made of ferrous metal.

Because the connection between the fixing and conducting plate and the electrode plates (projections on the electrode plates) is implemented by melting with an energy beam the metal material of the fixing and conducting plate, or by melting both the metal material of the fixing and conducting plate and the metal material of the projections, the fixing and conducting plate and the electrode plates can be integrated together strongly. Moreover, the use of a metal material to configure the fixing and conducting plate enables the reliable conduction of electrical power generated by an electrode reaction.

A recessed section that accepts projections of the electrode plates is preferably located on the side surface of the fixing and conducting plate that contacts the electrode plates. The recessed section is formed to accept the electrode plate projections, one by one. For example, in the case where a plurality of electrode plates is aligned to form a row of projections, it is preferable to provide a groove capable of accepting the row of projections collectively in a group. The method of forming the groove may be selected appropriately from among conventional metal processing techniques, and a detailed description is omitted herein as the groove forming method does not characterize the present invention. Typically, the groove is formed by a press process or roll press process.

Moreover, the groove may be formed with a shape that closely adheres to the shape of the projection on the electrode plate when the projection is inserted into the groove, however a shape that leaves some space inside the groove when the projection is inserted is preferable. For example, when connecting to an electrode plate having a projection of approximately triangular shape, a fixing and conducting plate is used in which the bottom portion of the groove thereon is rounded.

Metal material of the fixing and conducting plate, having been melted by an energy beam, flows into the space inside the groove, and the molten metal solidifies to fill that space. This type of metal material connects the fixing and conducting plate to the electrode plate, and increases the connection strength of both.

The fixing and conducting plate of the present invention may also serve as a part of the battery container. For example, in the case where the battery container is comprised of a main container housing an electrode body (core part including a positive electrode plate, a negative electrode plate, and a separator) and electrolytic matter, and a sealing plate (cover) for sealing the main container, a fixing and conducting plate of either polarity may be used as the sealing plate. Moreover, if a fixing and conducting plate is formed in the shape of a container, that fixing and conducting plate itself may be used as the main container. It is possible to use a fixing and conducting plate of one polarity as the main container and a fixing and conducting plate of another polarity as the sealing plate. Moreover, in the case where open-cylinder-shaped containers are used as separate members on both ends, at least one of the ends may be sealed with one of the fixing and conducting plates.

The battery container itself does not characterize the present invention, and thus a detailed description is omitted herein.

When constructing the electrode unit, the energy beam required to connect together the electrode plate and the fixing and conducting plate should be capable of melting local areas of the object being radiated, i.e., the fixing and conducting plate, and the vicinity thereof, and conditions such as the material and thickness of the fixing and conducting plate may be selected appropriately. Examples of this type of energy beam include an electron beam, as well as various laser beams such as a YAG laser, $CO_2$ laser, semiconductor laser, and excimer laser.

A nickel-metal hydride secondary battery was described in the embodiment above, but the present invention is also applicable to secondary batteries such as a lithium secondary battery, and to various primary batteries, for example. Moreover, in the above-described embodiment, the present invention was applied to both a negative electrode unit formed by connecting together negative electrode plates and a negative fixing and conducting plate, and to a positive electrode unit formed by connecting together positive electrode plates and a positive fixing and conducting plate, however the present invention may also be applied only to an electrode unit of either polarity.

What is claimed is:

1. A battery comprising an electrode unit, the electrode unit comprising:

a plurality of electrode plates, at least one projection being formed on a portion of an edge of each electrode plate; and a fixing and conducting plate formed of metal for fixing the electrode plates at predetermined positions and electrically connecting the electrode plates, wherein the electrode plates are positioned parallel with each other leaving a gap between adjacent electrode plates, the fixing and conducting plate is positioned perpendicular to the electrode plates, a groove for accepting the projections that extends continuously between the plurality of the electrode plates in a direction perpendicular to the electrode plates is formed on the fixing and conducting plate, and the projections are accepted within the groove of the fixing and conducting plate, each projection being surrounded by a material comprising a metal formed by melting and solidifying the metal forming the fixing and conducting plate.

2. A battery as defined in claim 1,
wherein the projections formed on the edges of the electrode plates are formed at overlapping positions when viewed from a direction perpendicular to the electrode plates.

3. A battery as defined in claim 2,
wherein a hole is formed on each electrode plate and the holes of the electrode plates are formed at an overlapping position when viewed from the direction perpendicular to the electrode plates.

4. A battery as defined in claim 3,
wherein a part of each electrode plate is covered with active material and the edge and hole are provided at a part not covered with the active material.

\* \* \* \* \*